Nov. 11, 1969     G. B. STILLIT     3,477,144
APPARATUS FOR TEACHING KNOWLEDGE
Filed April 8, 1968     3 Sheets-Sheet 1
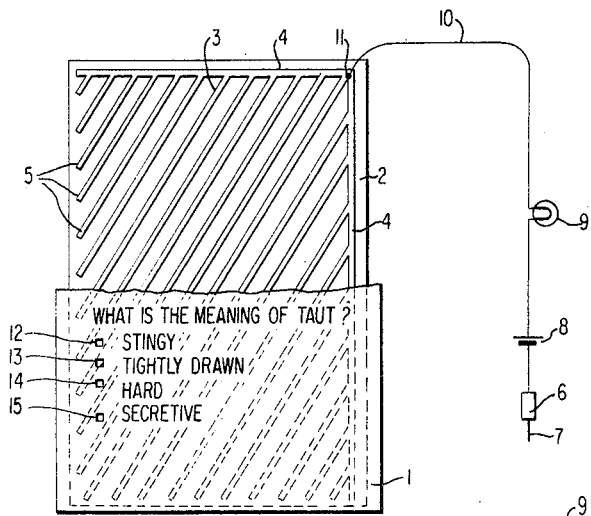
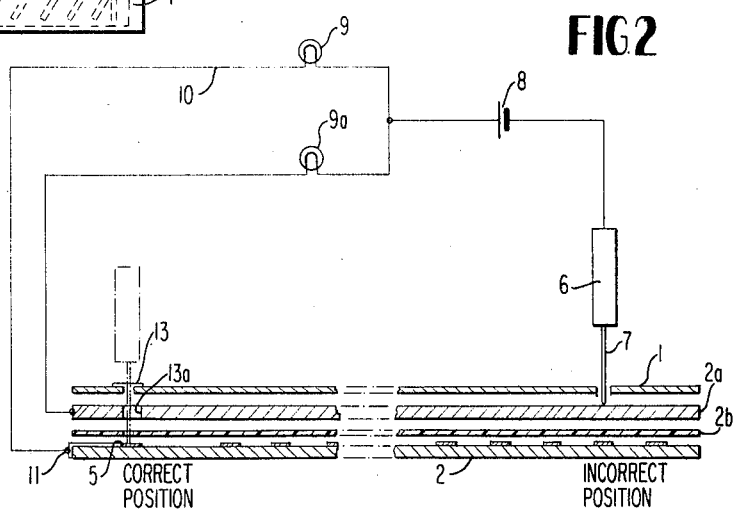
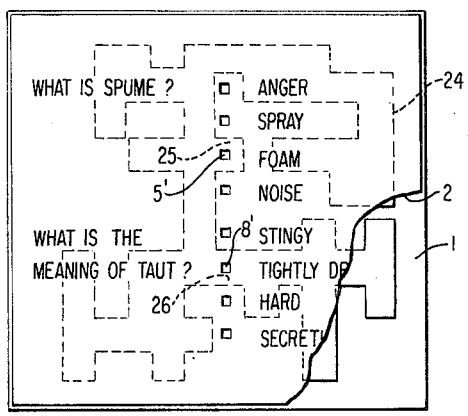
INVENTOR
GERALD BARRY STILLIT
BY
ATTORNEYS

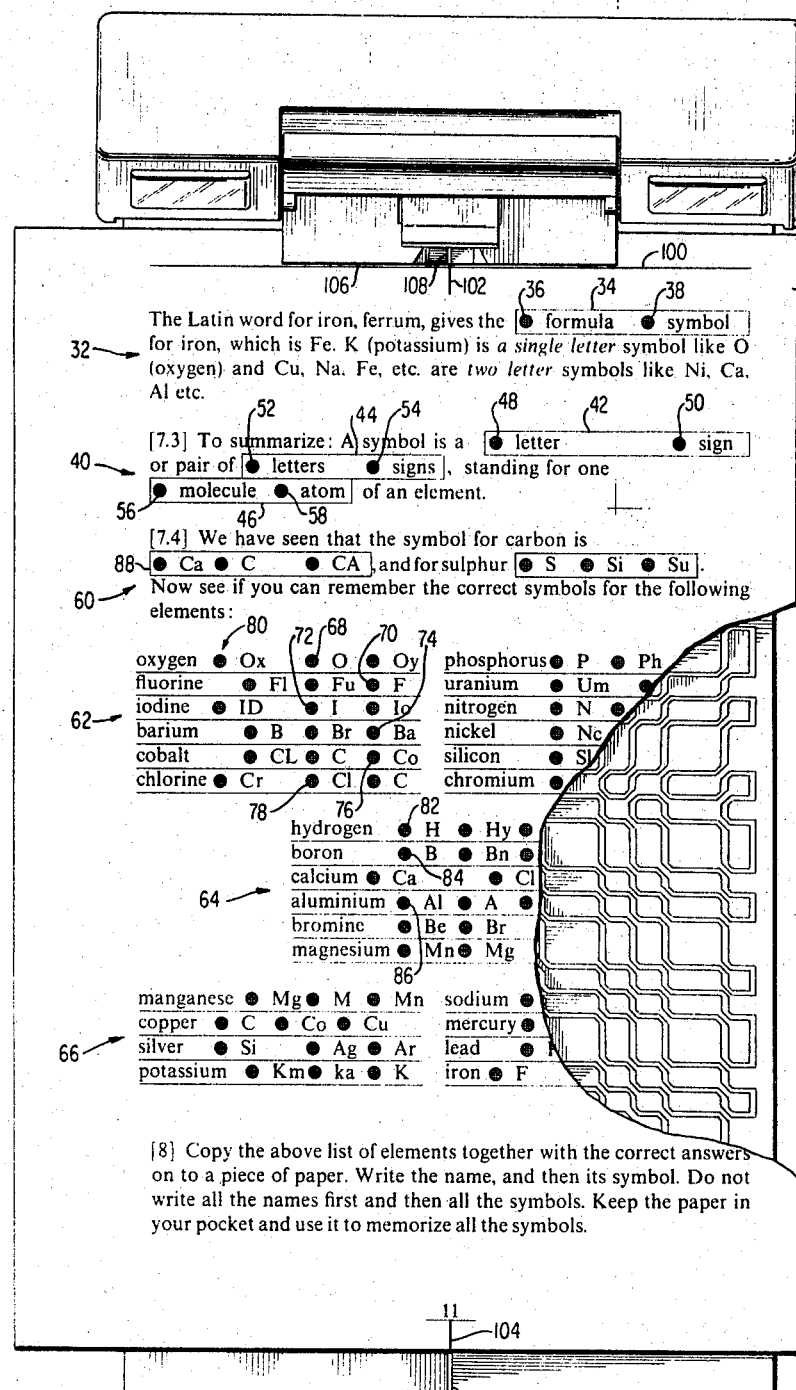
FIG 6
FIG 7

United States Patent Office 3,477,144
Patented Nov. 11, 1969

3,477,144
APPARATUS FOR TEACHING KNOWLEDGE
Gerald Barry Stillit, 15 Hill View, Primrose Hill Road, London NW. 3, England
Continuation-in-part of application Ser. No. 549,550, May 12, 1966. This application Apr. 8, 1968, Ser. No. 719,496
Claims priority, application Great Britain, Aug. 22, 1963, 33,333
Int. Cl. G09b 7/06
U.S. Cl. 35—9
6 Claims

ABSTRACT OF THE DISCLOSURE

A backing member adapted to underlie a page of a book containing questions and multiple choice answers in which each possible answer has a related area which may be penetrated by a signalling probe which contacts the backing member to complete an electrical circuit indicating the correctness of the answer selected. The backing member has an electrically conductive pattern thereon which permits wide latitude in the format of the page or sheet containing the questions and answers without allowing the student to guess which answers are correct by virtue of their position on the page.

CROSS REFERENCE TO RELATED APPLICATIONS

This application is a continuation-in-part of my copending applications Ser. No. 549,550, filed May 12, 1966, now U.S. Pat. No. 3,397,466, and Ser. No. 667,304, filed Sept. 12, 1967, and which is a continuation of application Ser. No. 391,144, filed Aug. 21, 1964 both now abandoned.

BACKGROUND OF THE INVENTION

The field of education is a burgeoning one due in large part to research efforts for determining which factors are most effective to evoke an efficient response from the student. Among other things, it appears that the factor of the student's interest and attention is one of the most vital elements which needs to be considered and various ways have been devised to promote the capturing and retention of the student's interest and enthusiasm. It has been found that student participation of a continuing nature may be used effectively to stimulate his interest and to retain it over protracted periods of time so that a maximum amount of knowledge is gained per unit of time. Since it is impractical and ineffective to question each student in turn to provoke an oral response to some specific question, the utilization of individual response by selection of a multiple choice answer on an answer sheet provided for each student has been found to be an effective way in which to force the student to participate in response to each question posed. Carrying this a little further, the combination of an individual question sheet and an individual answer sheet for each student has been proposed and, ultimately, this has led to the utilization of a teaching aid in which the student may on his own study the questions on his question sheet and make manipulation on his answer sheet which, in association with the teaching aid device, apprises the student as to whether or not he has correctly answered the question.

Such teaching aids have been proposed to take the form of a board or backing member for the answer sheet or for a combined question and answer sheet (in each case there being a multiple choice of possible answers only one of which is correct) with there being a probe member which the student manipulates to penetrate in a designated region adjacent that answer which he considers correct which, if correct, presents him with a visual or audio signal. Provision may also be made for presenting the student with a signal indicating an incorrect answer.

In any event, two factors must be considered when utilizing such type of teaching aid. First of all, it must not be apparent readily to the student that there is a pattern on any given sheet wherein the correct answers will lie for this will defeat the entire purpose of the device by enticing some students to learn this pattern and choose the correct answers on that basis rather than on the basis of genuinely pondering the question posed and intellectually selecting the correct answer strictly on the basis of the question posed. Secondly, it will be obvious that should the arrangement of the teaching device by such as to formulate rigidity or restriction on the format of the combined question and answer sheet or if the same type of answer sheet is always employed, the visual repetition from sheet to sheet presents a likely source of boredom for the student so that his attention and interest are not retained for any extended period of time.

An example of a teaching device employing an answer sheet utilized with the apparatus in conjunction with a separate examination sheet is present in the Wellington et al. Patent 3,057,082. This device employs an answer sheet having columns and rows of perforations which is placed upon a perforated plastic sheet beneath which is placed a blank sheet of puncturable paper, the perforated plastic being permanently associated with a circuit board having a plurality of electrically conducted contact strips for progress randomly in a generally vertical direction to correspond to correct answer positions with respect to the perforated plastic sheet. The student must then not only study the separate examination sheet but then must also correlate this to the separate answer sheet and select the correct answer. Provision is made to provide signals both for correct and incorrect answers.

The Thelen Patent 3,106,027 is an example of a combined question and answer sheet in which each question posed has a plurality of possible answers associated therewith. A control sheet is placed over an electrically conductive sheet and the control sheet contains openings therein corresponding to the position of the correct answers on the associated question and answer sheet. If the pattern of correct answers is not to be identical from sheet to sheet of questions and answers, a separate control sheet must be provided for each different question and answer sheet.

BRIEF SUMMARY OF THE INVENTION

The present invention relates to teaching devices of the general type described hereinabove but is restricted to that type wherein a combined question and answer sheet is provided. The present invention utilizes a single electrically conductive circuit board arrangement which may be utilized with any question and answer sheet and the construction of the circuit board is such as to allow the format of the question and answer sheet to be randomized within large limits so as to avoid visual repetition and monotony not only from page to page or sheet to sheet but within any individual sheet itself. In this fashion, the question and answer sheets may be made visually interesting as an added inducement for the retention of the student's interest and to avoid monotony in the visual aspect of the device which would tend otherwise to detract from the student's interest and especially the retention thereof over protracted periods of time.

This invention also makes it a simple matter to provide self-educational books which actually have the appearance of books from page to page thereof and do not impart the appearance of a rigidized and limited question and answer format. This possibility also leads to the presentation of the subject matter in a visual form which may be tailored to the educational level of the student. For example, it may be advisable for children's books to retain a relatively simple format and one which does not vary so much from sheet to sheet or page to page as might tend to confuse the child but which nevertheless does have some degree of variation commensurate with that found to be acceptable to the child. More advanced students may require substantial randomization of format, say from chapter to chapter, within each page, or the like as may be found best suited for the characteristics of the type of student to which the subject matter is to be presented.

The objectives of the present invention are attained by providing a uniformly useable circuit board in which there are electrically conductive areas provided in branches which are oriented with respect to the vertically spaced lines of the printed question and answer page in such fashion as to lend a maximum of liberty in selecting the format of the written presentation of the subject matter involved. In one embodiment of the invention, the electrically conductive branches corresponding to correct answers take the form of a series of parallel strips running diagonally or angularly beneath the question and answer sheet with respect to the lines of printing thereon and with there being intervening areas for correspondence to the disposition of incorrect answer designations.

In another embodiment of the invention, the electrically conductive branches corresponding to correct answer positions not only extend in generally angular relationship with respect to the printed lines of the superposed question and answer sheet but they also change direction and are randomized as to the extent of their areas giving still greater possibility of format selection.

BRIEF DESCRIPTION OF THE FIGURES OF THE DRAWING

FIG. 1 shows an apparatus for teaching knowledge according to the invention, the printed record having the form of a printed sheet shown partly cut away to show the platen clearly;

FIG. 2 shows a longitudinal section through a modified form of the invention for use in combination with the plane element and the printed sheet shown in FIG. 1;

FIG. 3 shows an alternative plane element in accordance with the invention, including electrical conducting means in the form of an irregular patch of electrically conducting material, the plane element being in register with a printed sheet;

FIG. 6 is a plan view showing a page of a teaching book operatively associated with the apparatus of FIGS. 4 and 5;

FIG. 7 is a vertical section taken substantially along the plane of section line 7—7 n FIG. 6 and illustrating certain of the component parts of the teaching apparatus.

DETAILED DESCRIPTION OF THE INVENTION

Figure 4:
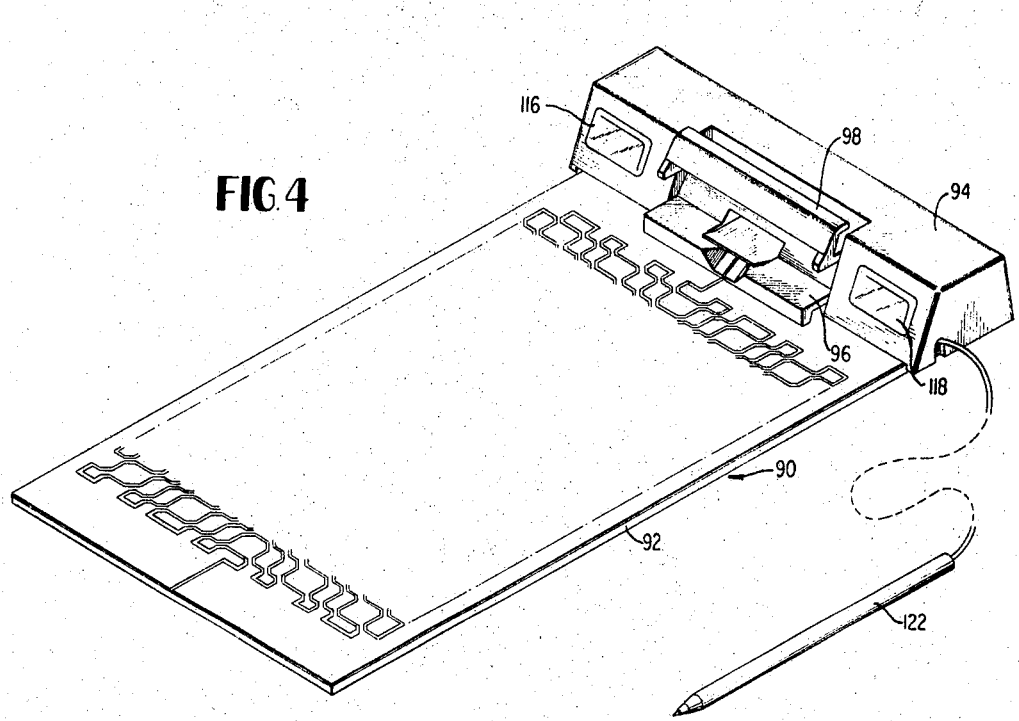
FIG. 4 is a perspective view of the preferred apparatus according to the present invention.

Referring first to FIG. 1 of the drawings, part of a printed record in the form of printed sheet 1 is shown, which carries a question, namely "What is the meaning of 'taut'?" and four feasible answers, namely "stingy," "hard," "secretive" and "tightly drawn," to the question linearly arranged in spaced relation in a column down the sheet below the question.

In the drawing, the upper part of the printed sheet 1 is cut away to show clearly the upper part of the platen 2, which platen lies underneath and in alignment with the printed sheet 1.

The platen 2 is formed with a pattern 3 of electrically conducting paths upon its surface, and may be constructed from any stiff insulating material such as cardboard, plastics, wood or other suitable material, the pattern being formed from metal foil adhesively secured to the face of the platen. The pattern may alternatively take the form of a printed circuit.

The pattern 3 of electrically conducting paths comprises an electrically conducting strip 4 which extends along one edge of the platen and continues across the top edge of the platen and forms a main conducting path, and a plurality of parallel electrically conducting strips 5 arranged diagonally on the platen to form branches emanating from the main path.

A manipulatable electrical contact element 6 having a sharp metal point 7 is connected through a battery 8, an electric bulb 9 and a flexible lead 10, to the main conducting path 4 at the point 11.

Adjacent each of the four feasible answers on the printed sheet there is printed a square to delineate a respective sensing vincinity 12, 13, 14 and 15, corresponding to each feasible answer, in any one of which defined vicinities the point 7 of the electrical contact element 6 is to be applied by the student.

The arrangement of the pattern 3 of electrically conducting paths on the platen and the positioning of the four vicinities 12, 13, 14 and 15 is such that when the printed sheet 1 and the platen 2 are in register, which may be achieved by registering means such as pegs projecting upwardly from the corners of the platen to fit through corresponding holes in the printed sheet, the only answer to whose vicinity a conducting path leads is the correct answer. In this case the correct answer is "tightly drawn" and so the vicinity 13 corresponding to this answer is the only vicinity which lies above a conducting path, all three other vicinities lying above insulating parts of the platen.

When a student is studying the printed sheet he will select an answer which he thinks to be the correct answer to the question and will pierce the sheet in the appropriate vicinity with the point 7 of the electrical contact element 6. If he has chosen the correct answer, i.e. "tightly drawn," he will pierce the sheet in the vicinity 13 and the point 7 of the contact element will make contact with the conducting path beneath vicinity 13, thus completing the circuit so that the electric bulb 9 will be energised and will light up, thereby immediately informing the student of his correctness and providing the reinforcement which is desired. If the student's answer was a wrong one, however, the contact element will not reach a conducting path and so the bulb will remain unlit.

In a modified construction according to FIG. 2 an apertured conducting plate 2a is in juxtaposed relation with the platen 2, but is separated from the platen by an electrically insulating layer 2b, e.g. of paper or plastic, the plate and platen being physically connected to form a composite assembly. The conducting plate 2a is apertured to correspond with the marked areas on the sheet to permit access of the contact element 7 through the printed sheet, an aperture (indicated at 13a) corresponding to the marked area 13, and the layer 2b, to the platen 2, so far as a correct answer is concerned. The conducting plate 2a presents a conducting area over the vicinities of the incorrect answers 12, 14 and 15, the platen and the conducting plate being connected in parallel to the electrical contact elements 6, 7 and the circuit including the conducting plate 2a having signalling means indicated at 9a contrasting with the signalling means 9 in the platen circuit.

In FIG. 3 of the drawings the printed sheet 1 has the same form as the printed sheet in FIG. 1 of the drawings but the plane element 2 shown in broken lines consists of a laminar base 11 made of an industrial plastics material, to the front of which is applied conducting means constituted by an irregular patch 24 of metal printed on the front face of the laminar base. This apparatus includes an energizing circuit (not shown) connected to the conducting means, the circuit being as shown in FIG. 1 and including a signalling bulb, a voltage source, and an electrical contact element.

It will be seen that when the printed sheet 1 and the plane element 2 are in register with each other, as shown in FIG. 3, the demarked areas 5' and 8' associated with the correct answers to the two questions on the sheet overlie respective areas 25 and 26 of the conducting patch 24, while the demarked areas associated with the incorrect answers overlie insulating parts of the plane element 2.

The foregoing description is directed to the general usage of the present invention and the electrically conductive patterns of FIGS. 1 and 3 will be seen to provide for each horizontal line of printing a plurality of areas within which may be positioned either correct or incorrect answer marked areas to which the probe element is to be applied and within the confines of which insertion or engagement of the probe will cause the circuitry to respond in such wise as to indicate that a correct answer has been given. Moreover, it will be apparent that the multitude of choices for a correct answer area within each horizontal line are not spacially repeated from line to line vertically down the sheet. It is this relationship which acts in combination with the combined question and answer relationship which allows the format of the question and answer sheet greatly to be varied not only within the confines of a single sheet but from sheet to sheet. With respect to this, reference is had to FIG. 6 wherein a typical question and answer sheet 30 is shown in detail. In the upper portion of the sheet 30 the paragraph 32 is in the form of a sentence completion test and the multiple choice portion for completion may be outlined in the box 34 as shown containing the two marked areas 36 and 38 followed by the word to which they correspond for proper completion of the sentence and of which, as will be apparent, the marked area 30 corresponds to the correct missing word. The paragraph 32 is clearly identifiable as a paragraph such as may be found in any textbook and imparts a degree of interest in proceeding with reading same commensurate with the level of knowledge desired to be taught. The next paragraph 40 contains three boxed in multiple choice regions 42, 44 and 46 each of which contains a pair of marked areas 48 and 50, 52 and 54, and 56 and 58, each associated with the possibly correct next word in the sentence. Obviously, the marked areas 48, 52 and 58 are the correct answer areas.

The next paragraph 60 is of similar form to the two preceding paragraphs 32 and 40. However, the remainder of the question regions on the page are of a different format, these regions being indicated by the reference characters 62, 64 and 66. Concerning specifically the left hand side of the region 62, it will be noted that the correct answer marked areas are those areas indicated by reference characters 68, 70, 72, 74, 76 and 78 and it will be noted that these areas are completely randomized. It will further be noted that the left hand columns of marked areas as indicated generally by the reference character 80 are laterally staggered in some instances lending further to the avoidance of visual monotony of the format presented and not necessarily having to do either with the absence or presence of correct or incorrect answers in that column. Note, for example, the correct answer marked regions 82, 84 and 86 in the first column in the region 64 which is also of a staggered nature. This relationship is also present in any horizontal line and may be staggered and chosen as desired. For example, note that in the region 34 the two marked areas 36 and 38 together with the words to which they correspond impart one form of horizontal symmetry or alignment which may for example be similar to that present in the region 46 but which is quite dissimilar from the arrangement within the region 42. Further, note the lack of symmetry in the box 88 within the region 60. Thus, one can avoid both horizontal and vertical symmetry or uniformity which tends to present a monotonous visual appearance and this is enhanced in the present instance by the fact that the multiple choice question regions may be placed in any horizontal line and need not appear in every line nor do they require to be placed in any special position within the horizontal line. Comparison of regions 62 and 64 illustrates the choice one has in altering the format even when the question format is identical. Thus, the format may be chosen at will to minimize monotony not only within one sheet but from one sheet to the next.

The preferred embodiment shown in FIG. 4 is a clipboard arrangement indicated generally by the reference character 90 having a base member 92 which constitutes a printed circuit on its upper face, as will be more particularly described hereinafter. The assembly includes the compartment portion 94 having a clip 96 mounted thereon with which a finger manipulable portion 98 is rigid so that the clip may be released (FIG. 7) to allow removal and insertion of the question and answer sheet or page 30. As will be apparent from FIG. 7, the base member 92 is sufficiently thin to be insertable between the pages of a book including page 30.

The page 30 is provided with a horizontal line 100 and a vertical line 102 at its top and with a vertical line 104 at its bottom. The horizontal line 100 is aligned substantially with the edge 106 of the clip and the vertical lines 102 and 104 are aligned respectively with the mark 108 on the clip and with the division line 110 at the lower end of the circuit board 92, this establishing the proper orientation of the page 30 with respect to the printed circuit.

Figure 5:
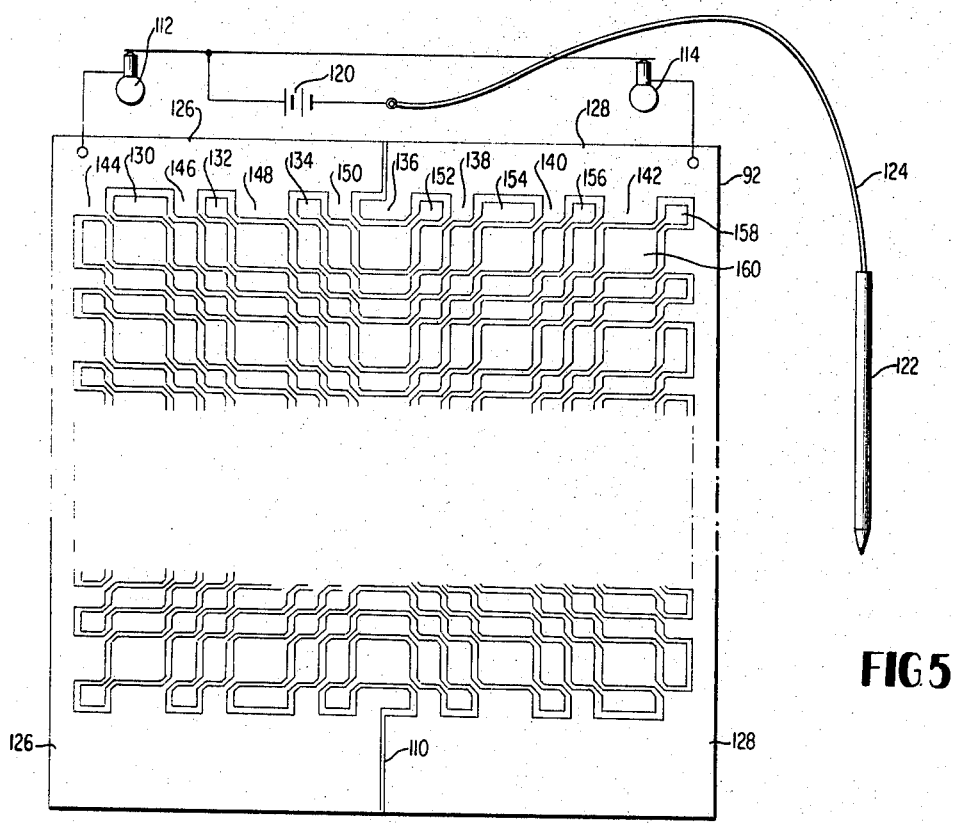
FIG. 5 is a plan view showing a portion of the circuit board arrangement of FIG. 4 and diagrammatically illustrating the circuit attachments thereto.

The printed circuit or like arrangement of FIG. 1 incorporates the main conductor portions 4 and the branches 5 extending diagonally with respect to the horizontal printing lines of the question and answer sheet and it is this randomization of the vertical disposition of possible correct answer areas and the placement thereof horizontally which enables the format of the question and answer sheet to be randomized and tailored to desired specific ends. Likewise, the irregular patch 24 of correct answer electrically conductive material of FIG. 3 provides the multiple disposition in a horizontal fashion for correct and incorrect answers and the vertical misalignment or staggering of possible correct answer areas which allows use of the randomization to which reference is had. In the preferred embodiment of the invention and particularly as is shown in FIG. 5, the circuit board 92 is separated into two regions and the branches of the respective regions effect a maximization of randomness in both the horizontal and vertical disposition of the desired correct answer or incorrect answer regions. FIG. 5 also illustrates that two indicators may be associated with the circuitry, for example the indicator 112 as will hereinafter appear corresponds to an incorrect answer whereas the indicator 114 corresponds to a correct answer and these two indicators are located behind the windows 116 and 118 (FIG. 4) which may be colored for example respectively red and green. The two indicators are connected in parallel to a suitable battery system 120 carried within the compartment 94 and the probe 122 is provided with a conductor 124 connected to the other side of the battery assembly 120 for completion of the circuit either through indicator 112 or 114 dependent upon the selection of the chosen answer. The line of demarkation 110 between the left hand conductive area 126 and the right hand conductive area 128 extends tortuously back and forth to provide branches of one or the other of these areas 126 or 128 bearing a random relationship for any horizontal line of printing across the sheet 30 superimposed thereupon. Thus, the first line of printing will overlie those islands 130, 132, 134, 136, 138, 140 and 142 which within the four branches correspond to electrically conductive areas which if engaged will evoke a correct answer response. The first line of printing overlies also the islands 144, 146, 148, 150, 152, 154, 156 and 158 corresponding to branches associated with the incorrect answer conductive portion 126. Thus, from what follows above, it is immediately apparent that the preferred arrangement allows the utilization of different islands, both for correct and incorrect answers which have different horizontal linear extents and which therefore further defy decoding by the student. FIG. 5 also illustrates that the islands may be of different vertical extents and this is illustrated in the next horizontal region of the conductive islands which correspond to the next two lines of printing on the sheet 30 superimposed thereupon. In this respect note that the island 160 is of greater vertical extent than the island 158 corresponding to the same branch. This irregularity of vertical extent and the previously mentioned irregularity in horizontal extent are carried on throughout the face of the circuit board as will be readily apparent from a study of FIG. 5.

Obviously, many modifications and variations of the present invention are possible in the light of the above teachings. It is therefore to be understood that within the scope of the appended claims the invention may be practiced otherwise than as specifically described.

What is claimed is:

1. Apparatus for teaching knowledge comprising a printed sheet carrying a sequence of questions, a plurality of feasible answers to each question displayed in spaced relation to each other and adjacent to the related question, there being one correct and at least one incorrect answer for each question, and a marked area in the vicinity of each feasible answer, a flat support for the printed sheet, said flat support including electrically conducting paths, an apertured conducting plate juxtaposed to the flat support, an electrically insulating layer between said flat support and said conducting plate, said insulating layer having apertures corresponding with those of the conducting plate, the apparatus further comprising a single manipulatable electrical contact element having a terminal for application to any one of the marked areas on the printed sheet, the conducting paths of said flat support and said conducting plate being respectively connected to the manipulatable contact element by first and second parallel circuits, first and second means including a voltage source for producing a sensible signal being respectively connected into said first and second circuits, said first means contrasting with said second means, and the arrangement of said conducting paths on the flat support and of the apertures in the conducting plate being so related to the marked areas on the printed sheet that the sheet and flat support can be brought together in register with said conducting plate and insulating layer therebetween so that electrical application of the manipulatable contact element through the printed sheet in the marked areas will cause the terminal thereof selectively to contact said conducting plate or the said conducting paths of the flat support, said conducting paths being contacted through an aperture of the conducting plate and insulating layer, so as selectively to close one of said parallel circuits and to operate one of said signalling means in a manner which will uniquely indicate the correct answers.

2. Apparatus according to claim 1, wherein the apertured conducting plate and the flat support are physically attached with the insulating layer therebetween to form a composite assembly.

3. In an educational system, in combination, a substantially flat board adapted to back a printed sheet, said board being sufficiently thin to be insertable between the pages of a book including said printed sheet, said printed sheet having a series of questions printed thereon within vertically spaced areas on the face of the sheet and each question having correct and incorrect answers related thereto, there being a marked area adjacent each of the feasible answers and visually identifiable therewith, means for holding said sheet in specifically oriented relationship to said board, a single probe having electrical contact means at one end thereof adapted to penetrate through a selected one of said marked areas of the sheet for electrical contact with the underlying surface of said board, said board having an electrically conductive pattern thereon covering a portion only of its surface, signalling means for indicating a correct answer, said probe, said signalling means and said electrically conductive pattern of the board forming an electrical circuit so that when said circuit is energized by a voltage source penetration of said contact means through the marked area of the sheet and into contact with said electrically conductive pattern will energize said signalling means to indicate a correct answer, said electrically conductive pattern having a plurality of branches forming upon each printed line of the sheet a plurality of possible locations for a marked area corresponding to a correct answer and each of said branches being laterally staggered in succeeding printed line locations whereby the format of said questions may be randomized and the locations of the marked areas corresponding to a correct answer may also be randomized throughout the area of the sheet.

4. In the educational system as defined in claim 3 wherein said pattern comprises a plurality of spaced, parallel branches.

5. In the educational system as defined in claim 3 wherein said pattern comprises a plurality of irregular branches each of which includes separate islands having disparate horizontal dimensions and disparate vertical dimensions.

6. In the educational system as defined in claim 5 including signalling means for indicating an incorrect answer, said board having substantially its entire surface covered by an electrically conductive layer, and there being a single line of separation between said pattern corresponding to correct answers and a second pattern corresponding to incorrect answers.

References Cited

UNITED STATES PATENTS

| | | | |
|---|---|---|---|
| 3,057,082 | 10/1962 | Wellington et al. | 35—9 |
| 3,100,352 | 8/1963 | Boisseuain | 35—9 |
| 3,106,027 | 10/1963 | Thelen | 35—9 |
| 3,141,244 | 7/1964 | Smith | 35—9 |
| 3,316,660 | 5/1967 | Greenspan | 35—9 |

EUGENE R. CAPOZIO, Primary Examiner

W. W. NIELSEN, Assistant Examiner